United States Patent [19]

Braat

[11] Patent Number: 4,556,967
[45] Date of Patent: Dec. 3, 1985

[54] RECORD CARRIER HAVING AN OPTICALLY READABLE INFORMATION STRUCTURE COMPRISED OF INFORMATION AREAS OF TWO DIFFERENT PHASE DEPTHS

[75] Inventor: Josephus J. M. Braat, Eindhoven, Netherlands

[73] Assignee: U.S. Philips Corporation, New York, N.Y.

[21] Appl. No.: 565,994

[22] Filed: Dec. 27, 1983

Related U.S. Application Data

[60] Division of Ser. No. 315,692, Oct. 28, 1981, Pat. No. 4,455,632, which is a continuation of Ser. No. 179,334, Aug. 18, 1980, abandoned, which is a continuation-in-part of Ser. No. 419,640, Sep. 17, 1982, abandoned, which is a continuation of Ser. No. 214,538, Dec. 8, 1980, abandoned, which is a continuation of Ser. No. 925,433, Jul. 17, 1978, abandoned.

[30] Foreign Application Priority Data

Apr. 25, 1980 [NL] Netherlands .......................... 8002411

[51] Int. Cl.$^4$ ............................................... G11B 7/00
[52] U.S. Cl. ...................................... 369/275; 369/48; 369/109

[58] Field of Search ................. 369/109, 111, 110, 44, 369/45, 46, 275, 47, 49, 48, 50; 250/201; 358/342; 346/762, 137

[56] References Cited

U.S. PATENT DOCUMENTS

| 4,161,752 | 7/1979 | Basilico | 369/275 |
| 4,209,804 | 6/1980 | Dil | 369/275 |
| 4,310,916 | 1/1982 | Dil | 369/275 |
| 4,325,135 | 4/1982 | Dil et al. | 369/275 |

FOREIGN PATENT DOCUMENTS 2036410  6/1980  United Kingdom ............... 369/275

Primary Examiner—Donald McElheny, Jr.
Attorney, Agent, or Firm—Robert T. Mayer; Algy Tamoshunas

[57] ABSTRACT

A record carrier is described which has an optically readable information structure in which information areas of adjacent information track portions have different phase depths, and an apparatus for reading said record carrier. By a suitable choice of the phase depths and by an electronic phase shift of the signals supplied by the read detectors, cross-talk between adjacent tracks can substantially be eliminated.

4 Claims, 12 Drawing Figures

RECORD CARRIER HAVING AN OPTICALLY READABLE INFORMATION STRUCTURE COMPRISED OF INFORMATION AREAS OF TWO DIFFERENT PHASE DEPTHS

This is a divisional of allowed application Ser. No. 315,692, Oct. 28, 1981 U.S. Pat. No. 4,455,632 which was a continuation of abandoned application Ser. No. 179,334, filed Aug. 18, 1980 which is a continuation-in-part of abandoned application Ser. No. 419,640, filed Sept. 17, 1982 which is a continuation of abandoned application Ser. No. 214,538, filed Dec. 8, 1980 which in turn is a continuation of abandoned application Ser. No. 925,433, filed July 17, 1978.

BACKGROUND OF THE INVENTION

The invention relates to a record carrier having an information structure which comprises optically readable information areas arranged in information tracks, adjacent information track portions differing from each other in that they comprise information areas of a first phase depth and information areas of a second phase depth respectively. The invention also relates to apparatus for reading such a record carrier.

Such a record carrier and apparatus for reading it are described in the Applicants' Netherlands Patent Application No. 78 03517 corresponding to abandoned U.S. Application Ser. No. 419,640, filed Sept. 17, 1982. In the record carrier described therein the first phase depth is preferably approximately $\pi$ rad. and the second phase depth approximately $2\pi/3$ rad.

When the information structure is scanned with a read beam, this beam is split into a zero-order subbeam and a plurality of higher order subbeams. The phase depth is defined as the difference between the phase of the zero order subbeam and the phase of one of the first order subbeams when the centre of the read spot formed on the information structure coincides with the centre of an information area. In said Netherlands Patent Application No. 78 03517 it is demonstrated that if the information areas in each of two adjacent information track portions have different phase depths, these track portions can be arranged more closely to each other than in the case where the information structure comprises information areas which all have the same phase depth. The information content of a record may then, for example, be doubled, without any significant increase in cross-talk between adjacent track portions.

However, the information track portions of different phase depths should then be read in different ways. The information track portions with the greater phase depths are read by determining the variation of the total intensity of the radiation received from the record carrier and passing through the pupil of the read objective. This is the so-called integral or central aperture read method. The information track portions with the smaller phase depth are read by determining the difference of the intensities in two tangentially different halves of the pupil of the read objective. This is the so-called differential read method.

SUMMARY OF THE INVENTION

It has been found that when an information track portion with the greater phase depth is read by the integral method there is nevertheless some cross-talk from an adjacent information track portion having the smaller phase depth.

It is the object of the present invention to eliminate this residual cross-talk. In accordance with a first aspect of the invention the record carrier is therefore characterized in that the difference between the first and the second phase depth is $\pi/2$ rad.

When the difference in phase depths is thus chosen, the desired cross-talk reduction can be achieved by applying an additional electronic phase shift of one detector signal or of both detector signals.

It is possible to adapt only the greater phase depth, for example, to make it $7\pi/6$ rad., and to maintain the smaller phase depth at the value of $2\pi/3$ rad. as specified in the Netherlands Patent Application No. 78 03517. The information track portions with the greater phase depth should then be read in accordance with the integral method and the information track portions with the smaller phase depth in accordance with the differential method. As the two read methods have different optical transfer functions ("modulation transfer function"; "M.T.F."), the alternate use of the two read methods could become perceptible in the signal which is ultimately supplied by the read apparatus. Moreover, the information areas with lower spatial frequencies can no longer be read in an optimum manner when the differential method is used.

Preferably, the information areas are therefore dimensioned so that they can all be read by means of the integral method. The preferred embodiment of the record carrier is characterized in that the first phase depth is approximately $5\pi/4$ rad. and the second phase depth approximately $3\pi/4$ rad.

The two phase depths may be realized in different manners, for example by areas with different refractive indices. Suitably, the information areas may be pits or hills. The advantage of this is that the record carriers can be manufactured in large quantities using pressing techniques. In the case of information areas in the form of hills or pits, the phase depth is related to the geometrical depth or heigth. In the case of pits or hills with steep walls the phase depth is mainly determined by the geometrical depth or heigth. If the walls of the pits or hills are less steep, the phase depth is also determined by the angles of inclination of said walls.

In accordance with a further characteristic feature of the record carrier, consecutive track portions within one information track differ from each other in that they comprise information areas of the first phase depth and information areas of the second phase depth respectively. This enables the visual effect of transitions between the two types of information areas in the signal which is ultimately supplied by the read apparatus to be reduced.

For correct timing of the desired electronic phase shift during read-out of the record carrier, in accordance with a further characteristic feature, the record carrier may contain a pilot signal in addition to an information signal, which pilot signal identifies the transitions between information areas of the first phase depth and information areas of the second phase depth and vice versa.

In accordance with a second aspect of the invention an apparatus for reading a record carrier containing information areas of two different phase depths, which apparatus comprises a radiation source producing a read beam, an objective system for focusing the read beam to a read spot on the information structure, and two radiation-sensitive detectors which are disposed in the far field of the information structure one on each side of a line which is effectively transverse of the track direction, the outputs of the two detectors being connected to an adder circuit, is characterized in that at least one of the detectors is connected to the adder circuit via a phase-shifting element, which element introduces, in the detector signal to, a phase shift of constant magnitude.

If the two phase depths of the information areas have been selected so that the entire information structure can be read by means of the integral method, the phase shifting element should introduce a phase shift which is equal to the difference between the two phase depths, viz. a phase shift of approximately $\pi/2$ rad.

Alternatively, the two phase depths may be selected so that one type of information areas is adapted to be read with the integral method, while the other type of information areas is adapted to be read with the differential method. A read apparatus which is adapted to read such a record carrier is characterized in that the outputs of the two detectors are also connected to a subtractor circuit, that the outputs of the adder circuit and the subtractor circuit are connected to a signal processing circuit via a switching element, and that a control input of the switching element is connected to an electronic circuit in which a switching signal is derived from the signal which is read from the record carrier. This apparatus is not only suitable for reading an information structure in which phase depths of $7\pi/6$ rad. and $2\pi/3$ rad. occur, but may also be used for reading the record carrier which is described in the previous Netherlands Patent Application No. 78 03517, i.e. a record carrier with phase depths of $\pi$ rad. and of $2\pi/3$ rad. In that case a phase-shifting element is included only in one of the connections between the detectors and the adder circuit, while the detectors are connected directly to the subtractor circuit. In apparatus for reading a record carrier with phase depths of $7\pi/6$ rad. and of $2\pi/3$ rad. at least one detector is connected both to the adder circuit and the subtractor circuit via a phase-shifting element. In the two last-mentioned apparatus the phase-shifting element introduces a phase shift of approximately $\pi/3$ rad.

For reasons of symmetry it is preferred, both in an apparatus which solely employs the integral read method and in an apparatus which employs both the integral read method and the differential read method, to connect each of the detectors via a phase shifting element the adder circuit only or to both the adder circuit and the subtractor circuit. Said element should then introduce phase shifts which are equal but of opposite sign. In the apparatus which only employs the integral read method, the phase-shifting elements should moreover be adjustable in such a way that the signs of the two phase shifts can be changed.

In order to ensure that the cross-talk reduction in accordance with the invention is still operative at smaller spatial frequencies of the information areas, the detectors are preferably each disposed against an edge of the effective pupil of the objective system. The effective pupil is to be understood to mean the image of the pupil in the plane of the two detectors.

BRIEF DESCRIPTION OF THE DRAWING

The invention will now be described in more detail with reference to the drawing wherein.

In these Figures similar elements always bear the same reference numerals.

DESCRIPTION OF THE PREFERRED EMBODIMENTS

Figure 1:
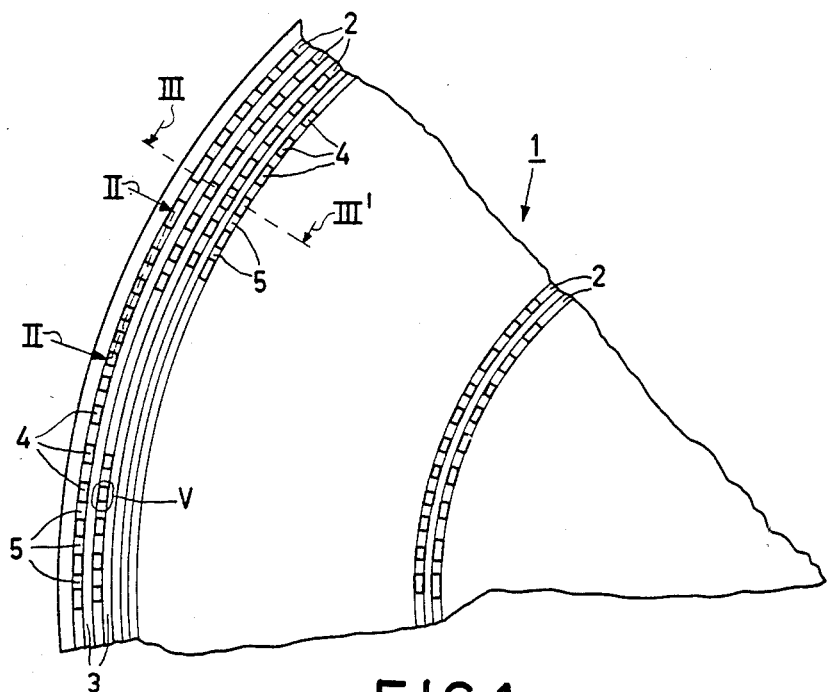
FIG. 1 is a plan view of a part of a first embodiment of a record carrier.
Figure 2:
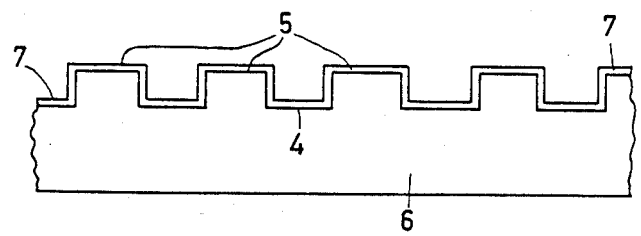
FIG. 2 is a tangential sectional view of said record carrier.
Figure 3:
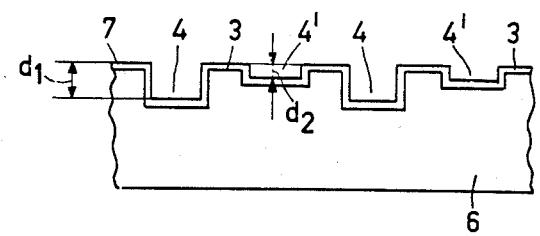
FIG. 3 is a radial sectional view of said record carrier.

FIGS. 1, 2 and 3 show a first embodiment of a record carrier in accordance with the invention. FIG. 1 is a plan view, FIG. 2 a tangential sectional view taken on the line II—II' in FIG. 1, and FIG. 3 a radial sectional view taken on the line III—III' in FIG. 1 of the record carrier. The information is contained in a multitude of information areas 4, for example pits in the substrate 6. These areas are arranged in accordance with tracks 2. Between the information areas 4, intermediate areas 5 are interposed. The tracks 2 are spaced by narrow lands 3. The spatial frequency, and as the case may be the lengths, of the areas is determined by the information.

The areas of the adjacent information tracks have different phase depths. As is shown in FIG. 3, the pits of a first track, a third track etc. are therefore deeper than the pits 4' of the second track, the fourth track etc. The geometrical depths of the pits 4 and 4' are designated $d_1$ and $d_2$. Owing to the different depths, the first track, the third track etc. can optically be distinguished from the second track, the fourth track etc. This enables said tracks to be packed more densely.

In a practical embodiment of a record carrier in accordance with the invention, the radial period of the information tracks was 0.85 $\mu$m, the width of these tracks was 0.5 $\mu$m and the width of the lands 3 was 0.35 $\mu$m.

The information carrying surface of the record carrier can be made reflecting, for example by vacuum-deposition of a metal layer 7 such as aluminium, on said surface.

It is to be noted that the size of the areas in the FIGS. 1, 2 and 3 has been exaggerated for the sake of clarity.

Figure 4:
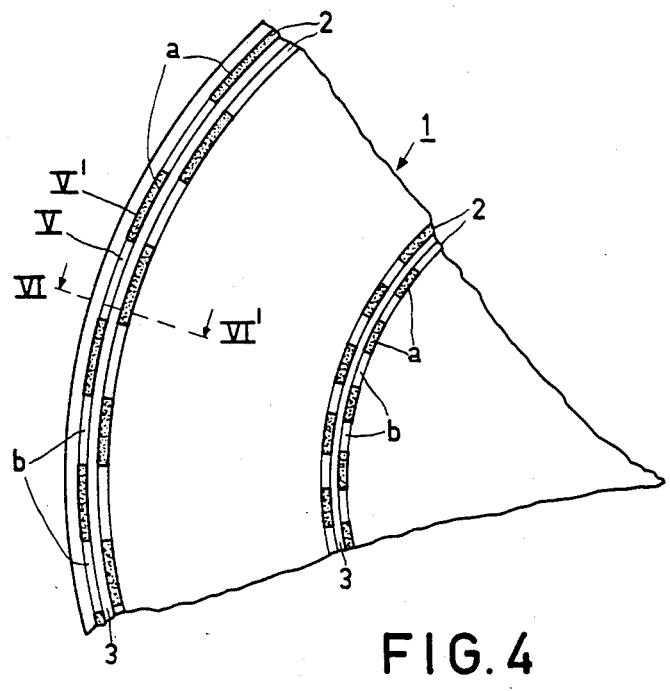
FIG. 4 is a plan view of a part of a second embodiment of a record carrier.

FIG. 4 is a plan view of a part of a second embodiment of a record carrier in accordance with the invention. This Figure shows a larger part of the record carrier than FIG. 1, the individual information areas being no longer discernible. The information tracks are now divided into portions a and b, the portions a comprising information areas of greater phase depth (deeper pits) and the portions b information areas of smaller phase depth.

Figure 5:
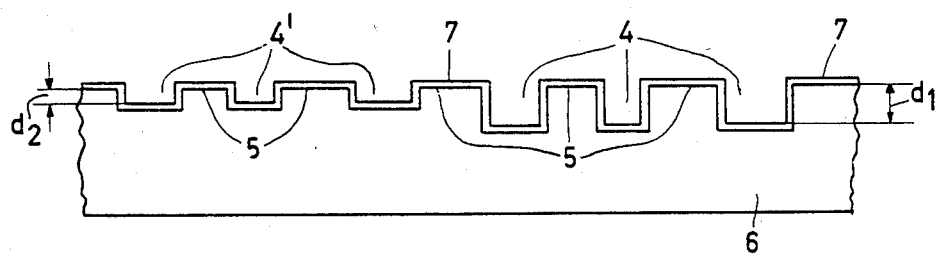
FIG. 5 is a tangential sectional view of said record carrier.

In FIG. 5, which is an enlarged tangential sectional view of a track taken on the line V—V' in FIG. 4, the pits of the depth $d_2$ are again designated 4' and the pits of the depth $d_1$ are designated 4.

Figure 6:
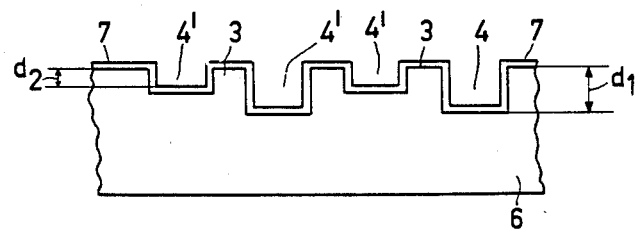
FIG. 6 is a radial sectional view of said record carrier.

FIG. 6 is a radial sectional view, taken on the line VI—VI' in FIG. 4, of the second embodiment of the record carrier.

In FIGS. 1 through 6, the information areas have perpendicular walls and the phase depth is dictated by the geometrical depth of the information areas. In practice the information areas will have oblique walls. The phase depth is then also determined by the angles of inclination of said walls.

Figure 7:
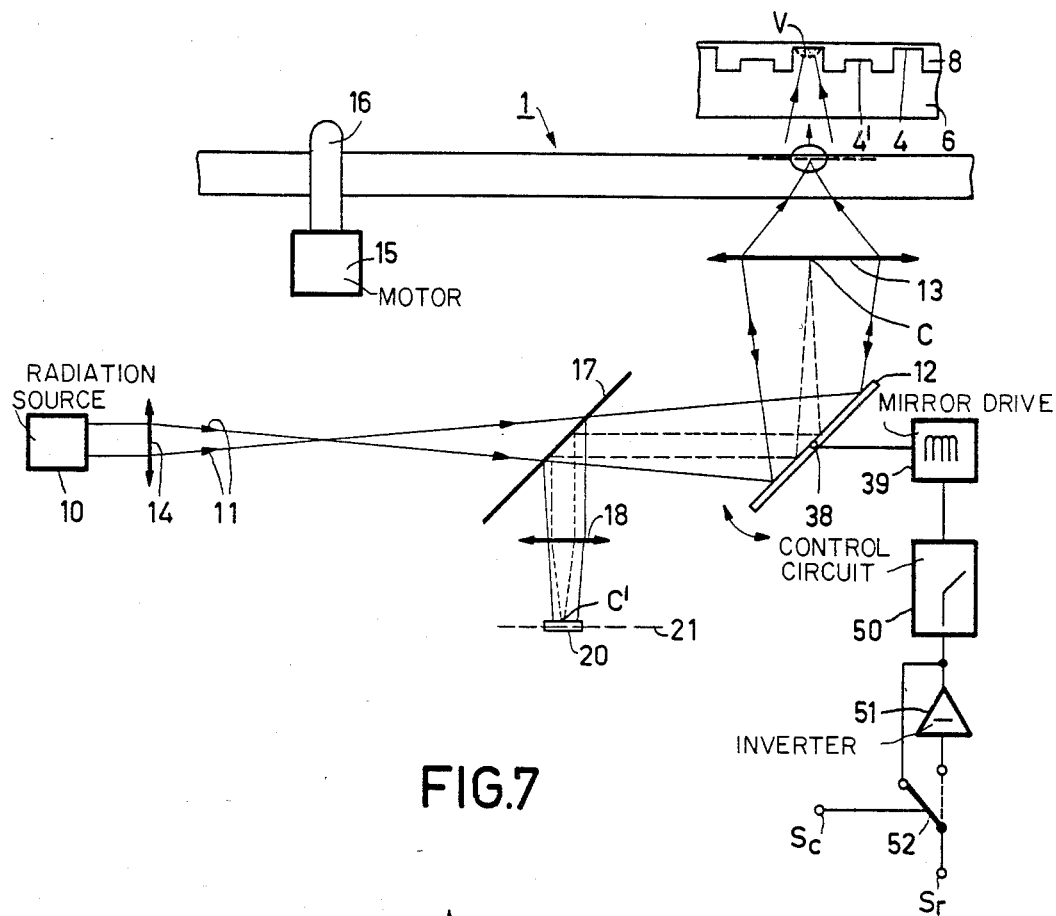
FIG. 7 shows an embodiment of a read apparatus.

FIG. 7 shows an embodiment of an apparatus for reading a record carrier. The disc-shaped record carrier is shown in a radial sectional view. The information tracks thus extend perpendicularly to the plane of the drawing. It is assumed that the information structure is disposed on the upper side of the record carrier and is reflecting, so that reading is effected through the substrate 6. The information structure may furthermore be covered with a protective layer 8. The record carrier can be rotated by means of a spindle 16, which is driven by a motor 15.

A radiation source 10, for example a helium-neon laser or a semiconductor diode laser, produces a read beam 11. A mirror 12 reflects this beam to an objective system 13, which is schematically represented by a single lens. The path of the read beam includes an auxiliary lens 14, which ensures that the pupil of the objective system is filled in an optimum manner. A read spot V of minimal dimensions is then formed on the information structure.

The read beam is reflected by the information structure and, as the record carrier rotates, is modulated in accordance with the sequence of the information areas in the information track to be read. By moving the read spot and the record carrier relative to each other in a radial direction, the entire information surface can be scanned.

The modulated read beam again traverses the objective system and is again reflected by the mirror 12. The radiation path includes means for separating the modulated and the unmodulated read beam. This may, for example, comprise a polarization-sensitive splitter prism and a $\lambda/4$ plate (wherein $\lambda$ is the wavelength of the read beam). For the sake of simplicity it is assumed in FIG. 7 that said means are constituted by a semitransparent mirror 17. This mirror reflects the modulated beam to a radiation-sensitive detection system 20.

This detection system comprises two radiation-sensitive detectors 22 and 23, which are disposed in the so-called "far field of the information structure", i.e. in a plane in which the centroids of the subbeams formed by the information structure, specifically of the zero-order subbeam and the first-order subbeams, are separated. The detection system may be disposed in the plane 21 in which an image of the exit pupil of the objective system 13 is formed by the auxiliary lens 18. In FIG. 7 the image C' of the point C of the exit pupil is represented by dashed lines.

Figure 8:
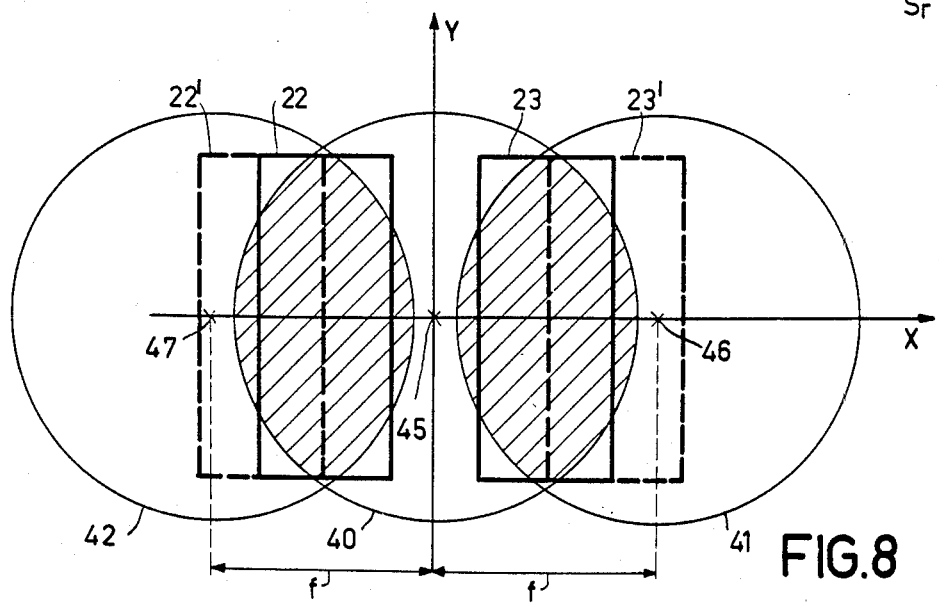
FIG. 8 shows the arrangement of the detectors relative to the various diffraction orders.

The information structure which comprises adjacent information tracks, which tracks comprise information areas and intermediate areas, behaves as a two-dimensional diffraction grating. This grating splits the read beam into a zero-order subbeam, a plurality of first-order subbeams and a plurality of higher-order subbeams. After being reflected by the information structure, a part of the radiation re-enters the objective system. In the plane of the exit pupil of the objective system, or in the plane in which an image of this exit pupil is formed, the centoids of the subbeams are separated from each other. FIG. 8 represents the situation in the plane 21 of FIG. 7.

The circle 40 with the centre 45 represents the cross-section of the zero order subbeams in this plane. The circles 41 and 42 with the centres 46 and 47 represent the cross-sections of the tangentially diffracted subbeams of the orders $(+1, 0)$ and $(-1, 0)$. The X-axis and the Y-axis in FIG. 8 corresponds to the tangential direction, or the track direction, and the radial direction, or the direction transverse of the track direction, on the record carrier. The distance f from the centres 46 and 47 to the Y-axis is determined by $\lambda/p$, where p is the local spatial period of the information areas in the information track portion to be read and $\lambda$ the wavelength of the read beam.

For reading the information use is made of the phase shifts of the subbeams of the $(+1, 0)$ and $(-1, 0)$ orders relative to the zero-order subbeams. In the hatched areas in FIG. 8 said first-order subbeams and zero-order subbeam overlap, so that interference occurs. The phases of the first-order subbeams vary with high frequencies as a result of the tangential movement of the read spot relative to the information track. This results in the intensity variations in the exit pupil, or in the image thereof, which variations can be detected by the detectors 22 and 23.

When the centre of the read spot coincides with the centre of an information area, a specific phase difference $\psi$ will occur between the first-order subbeam and the zero-order subbeam. This phase difference is called the phase depth of the information area. At the transition of the read spot from a first information area to a second information area the phase of the subbeam of the $(+1, 0)$ order increases by $2\pi$. Therefore, when the read spot moves in a tangential direction the phase of said subbeam relative to the zero-order subbeam will vary by $\omega t$. Here, $\omega$ is a time frequency which is determined by the spatial frequency of the information area and by the speed with which the read spot travels over the track.

The phases $\theta(+1, 0)$ and $\theta(-1, 0)$ of the first-order subbeams relative to the zero-order subbeam may be represented by:

$$\theta(+1, 0) = \psi + \omega t$$

$$\theta(-1, 0) = \psi - \omega t$$

The intensity variations as a result of interference of the first-order subbeam with the zero-order subbeam are converted into electric signals by the detectors 22 and 23. The timedependent output signals $S_{23}$ and $S_{22}$ of the detectors 23 and 22 may be represented by:

$$S_{23} = B(\psi) \cos(\psi + \omega t)$$

$$S_{22} = B(\psi) \cos(\psi - \omega t)$$

Here $B(\psi)$ is a factor which is proportional to the geometrical depth of the pits. For $\psi = \pi/2$ it may be assuemd that $B(\psi)$ is zero.

Figure 9:
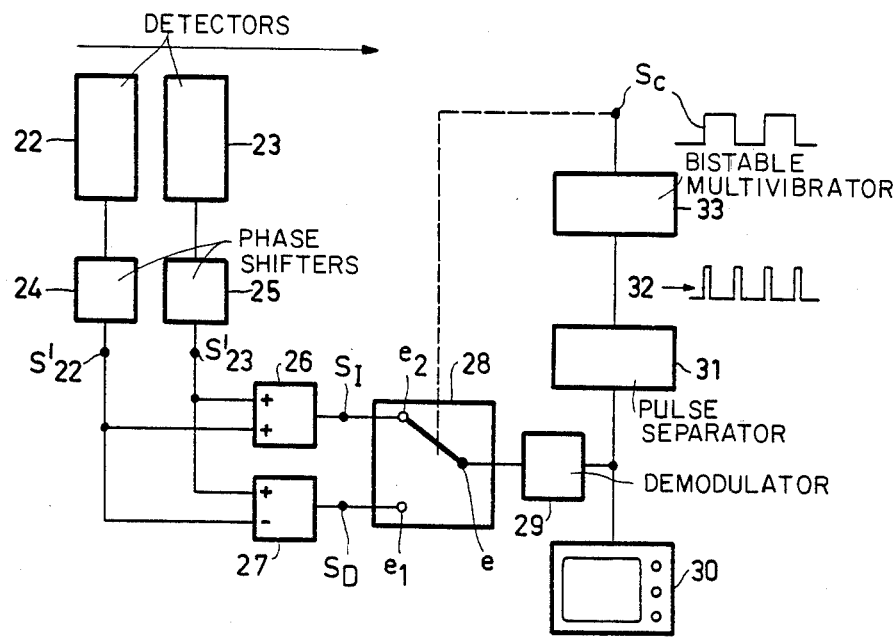
FIG. 9 shows a first version of the electronic circuit for processing the detector signals.

In a first embodiment of a record carrier in accordance with the invention, the phase depth $\psi_1$ of the information areas 4 is $7\pi/6$ rad. and the phase depth $\psi_2$ of the information areas 4' is $2\pi/3$ rad. In the apparatus for reading said record carrier, as is shown in FIG. 9, the outputs of the detectors 22 and 23 are connected to the phase shifting elements 24 and 25. The element 24 shifts the phase of the detector signal $S_{22}$ through $+\phi$ rad, while the element 25 shifts the phase of the detector signal $S_{23}$ through $-\phi$ rad. The signals $S_{22}$ and $S_{23}$ then change to:

$$S'_{23} = B(\psi) \cdot \cos\{\psi + (\omega t - \phi)\} = B(\psi) \cdot \cos(\psi + \omega t - \phi)$$

$$S'_{22} = B(\psi) \cdot \cos\{\psi - (\omega t + \phi)\} = B(\psi) \cdot \cos(\psi - \omega t - \phi)$$

When the information areas of an information track portion being read have the greater phase depth $\psi_1 = 7\pi/6$ rad. the signals $S'_{22}$ and $S'_{23}$ should be added, while if the information areas of the information track portion being read have the smaller phase depth, $\psi_2 = 2\pi/3$ rad., the signals $S'_{22}$ and $S'_{23}$ should be subtracted from each other. For this purpose, as is shown in FIG. 9, the signals $S'_{22}$ and $S'_{23}$ may be applied both to the adder circuit 26 and to the subtractor circuit 27. The outputs of the circuits 26 and 27 are connected to the two input terminals $e_1$ and $e_2$ of a switch 28 having one master terminal e. Depending on the control signal $S_c$ applied to its control input, said switch transfers either the sum signal of the detectors 22 and 23 or the difference signal of said detectors to a demodulation circuit 29. In this circuit the read out signal is demodulated and rendered suitable for reproduction with for example a television set 30.

For controlling the switch 28, a control signal should be generated. In addition to the actual information signal the record carrier may contain a pilot signal, which indicates the positions on the record carrier where a transition occurs from the information areas of a first phase depth to the information areas of a second phase depth. If a television signal has been recorded, one television signal being recorded per information track revolution, the picture synchronizing pulses or field synchronizing pulses contained in the actual television signal may be employed for generating the control signal $S_c$ and no separate pilot signal is needed. The pilot signal may be needed if an audio signal has been recorded.

If the information of the lines of a television picture is contained in track portions a and b in accordance with FIG. 4, the line synchronizing pulses 32, as shown in FIG. 9, may be extracted from the signal from the demodulation circuit 29 in the line synchronizing pulse separator 31. In the circuit 33, which is for example a bistable multivibrator, the pulses 32 are converted into a control signal $S_c$ for the switch 28, so that said switch is changed over each time after reading one television line.

If each information track of the information structure contains only one type of areas, the element 31 is a picture synchronizing pulse separator and the switch 28 is changed over after read-out of each information track or two television fields.

When point $e_2$ in the switch is connected to point e, the so-called integral read method is employed. The signal applied to the demodulator 29 may then be expressed by:

$$S_I = S'_{23} + S'_{22} = 2 \cdot B(\psi) \cdot \cos(\psi - \phi) \cdot \cos(\omega t).$$

If point e is connected to point $e_1$, reading is effected in accordance with the so-called differential method. The signal applied to the demodulator may then be expressed by:

$$S_D = S'_{23} - S'_{22} = -2 \cdot B(\psi) \cdot \sin(\psi - \phi) \cdot \sin(\omega t).$$

The integral method is employed when reading information areas having a phase depth $\psi_1 = 7\pi/6$ rad. The signal $S_I$ is then a maximum if $\cos(\psi_1 - \phi) = 1$, i.e. if $\phi = \pi/6$ rad. For the information areas of the phase depth $\psi_2 = 2\pi/3$ rad, $\cos(\psi - \phi) = 0$. Thus, when reading in accordance with the integral method, the information areas of the smaller phase depth are not "observed". Conversely, when the differential read method is used the information areas 4' of a phase depth $\psi_2 = 2\pi/3$ rad. will be read in an optimum manner, for $\sin(2\pi - \phi/3)$ is then 1, whilst the information areas 4 of the phase depth $\psi_1 = 7\pi/6$ rad. are then not "observed", for $\sin(7\pi - \phi/6)$ is then 0.

Instead of the two phase-shifting elements 24 and 25 it is alternatively possible to use the phase shifting element 25 only. If the phase shift $\phi$ of said element is selected to be $\pi/3$ rad., the same result is obtained.

Figure 10:
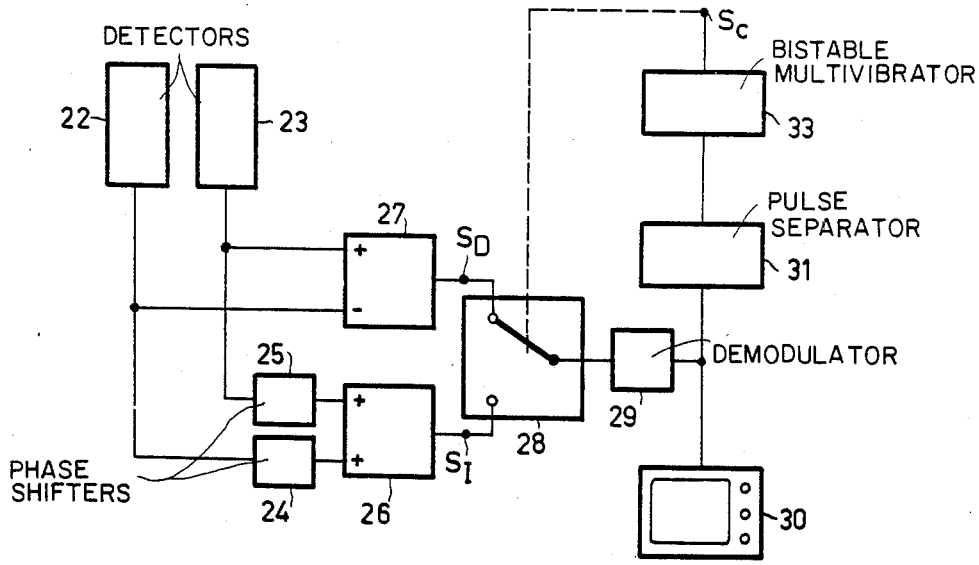
FIG. 10 shows a second version of said electronic circuit.

By means of an apparatus in which one detector signal or both detector signals are subjected to an additional phase shift, it is also possible to obtain a substantial improvement of the read-out of the record carrier described in Netherlands Patent Application No. 78 03517, i.e. of the record carrier having the phase depths $\psi_1 = \pi$ rad. and $\psi_2 = 2\pi/3$ rad. The apparatus adapted for reading this record carrier is shown in FIG. 10.

The signals from the detectors 22 and 23 are applied directly to the subtractor circuit 27. In the connections between said detectors and the inputs of the adder circuit 26 phase shifting elements 24 and 25 are included, which introduce a constant phase shift of $+\phi$ rad. and $-\phi$ rad. respectively. During differential read-out of the information areas of the phase depth $\psi_2 = 2\pi/3$ rad., the information areas of the phase depth $\psi_1 = \pi$ rad. will produce no cross-talk. The cross-talk from the information areas of $\psi_2 = 2\pi/3$ rad. during read-out by the integral method of information areas of $\psi_1 = \pi$ rad. can be substantially eliminated if $\phi = \pi/6$ rad. As a result of this phase shift the amplitude of the signal $S_I$ decreases slightly, but is still sufficiently high. It is alternatively possible to employ the phase shifter 24 only, which should then introduce a phase shift of $\pi/3$ rad.

For the values of the phase depths $\psi_1$, $\psi_2$ and the phase shift $\phi$ specified in the foregoing, the integral read method and the differential read method must be used alternately. However, these two methods have different optical modulation transfer functions. If a video signal is stored on the record carrier, one transfer function will, for example, cause different grey shades or a different colour saturation in the ultimate television picture than the other transfer function. In the case of an audio signal in the form of a frequency-modulated signal, switching between the transfer functions may become audible as an undesired frequency.

Furthermore, for reading lower spatial frequencies of the information areas, the transfer function of the differential method is worse than that of the integral method.

Suitably, the phase depths $\psi_1$ and $\psi_2$ are therefore selected so that they are symmetrical relative to $\pi$ rad. The phase depth $\psi_1$ is then $5\pi/4$ rad. and the phase depth $\psi_2$ is then $3\pi/4$ rad. The magnitude of the phase shift $\phi$ is then $\pi/4$ rad.

Figure 11:
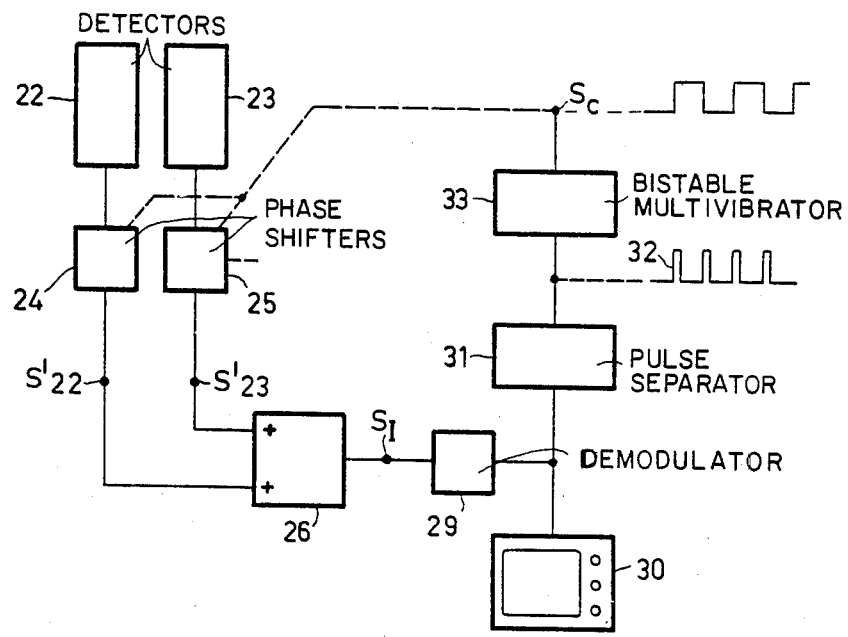
FIG. 11 shows a third version of said electronic circuit.

FIG. 11 shows a signal processing circuit of an apparatus for reading this record carrier. The detectors 22 and 23 are each connected to a phase shifting element 24 and 25 respectively. The element 25 introduces a phase shift $-\phi$ and the element 24 a phase shift $+\phi$, the magnitude of $\phi$ being $\pi/4$ rad. The sign of $\phi$ should now be changed at the transition from information areas of the greater phase depth to information areas of the smaller phase depth and vice versa. When reading the information areas of the greater phase depth $\phi = +\pi/4$ rad. and when reading information areas of the smaller phase depth $\phi = -\pi/4$ rad. For changing the sign of the phase shift $\phi$ it is again possible to employ the signal $S_c$.

The information signal $S_I$ is always given by:

$$S_I = S'_{23} + S'_{22} = 2.B(\psi) \cdot \cos(\psi - \phi) \cdot \cos(\omega t).$$

When the information areas 4 of the phase depth $\psi_1 = 5\pi/4$ rad. are read, then $\phi = +\pi/4$ rad. Then, cos $(\psi_1 - \pi/4)$ is equal to 1. For the information areas 4' of the phase depth $\psi_2 = 3\pi/4$ rad., cos $(\psi_2 - \pi/4)$ is equal to 0, so that these information areas will produce no cross-talk. When the information areas 4' are read $\phi = -\pi/4$ rad. and cos $(\psi_2 + \pi/4)$ is 1, whilst cos $(\psi_1 + \pi/4)$ is 0, so that the information areas 4 of the greater phase depth are not "observed" and thus produce no cross-talk.

The values for the phase depths specified in the foregoing are no strict values. Deviations of the order of some degrees are permissible.

It is possible that the difference between the phase depth $\psi_1$ and $\psi_2$ deviates from $\pi/2$ rad. However, by adapting the electronic phase shift $\phi$ it is still possible to ensure that the cross-talk between adjacent information track portions is minimized.

So far only the tangentially diffracted first-order subbeams have been discussed. The information structure also diffracts the read radiation in higher tangential orders and in various radial and diagonal orders. The information areas, which for the tangential first orders exhibit a difference between the phase depths $\psi_1$ and $\psi_2$ of $\pi/2$ rad., however, will also exhibit such a phase depth difference for the higher tangential orders and for the radial and diagonal orders. The subbeams which are diffracted otherwise than in the tangential first orders will not significantly influence the effect of cross-talk reduction and need not be further considered.

In the foregoing it has been assumed that the signals supplied by the detectors have a fixed phase difference which is determined by the phase depth of the information areas. By influencing this phase difference with the aid of an electronic phase shifter, the signal produced by said information areas can be maximized during readout of information areas of a first phase depth and the signal from information areas with a second phase depth can be minimized. It is then assumed that the detector 22 only receives the beam 42 and the detector 23 only receives the beam 41. At lower spatial frequencies of the information areas, i.e. at greater periods p of said areas, the distance f in FIG. 8 becomes smaller and the first-order beams 41 and 42 will overlap each other. The detector 22 or 23 would then no longer receive radiation of the respective beam 42 or 41 only, but also radiation of the beam 41 and 42 respectively. The phases of the first-order beams could then no longer be influenced individually, so that no cross-talk reduction in accordance with the invention could be obtained. In order to enable a satisfactory cross-talk reduction to be realized at lower spatial frequencies, the radiation-sensitive areas of the detectors, instead of being disposed as closely as possible to each other and in the centre of the pupil, as is shown in FIG. 8 by the uninterrupted lines, are arranged as far as possible from each other and at the edge of the pupil. In FIG. 8 the last-mentioned positions of the detectors are represented by the dashed lines 22' and 23'. The limit for the spatial frequencies at which the detector 22 receives only the beam 42 and the detector 23 only the beam 41, is then considerably reduced.

During reading, the read spot should remain accurately positioned on the centre of the track to be read. For this purpose the read apparatus comprises a fine control for the radial position of the read spot. As is shown in FIG. 7, the mirror 12 may be mounted for rotation. The axis of rotation 38 of the mirror is perpendicular to the plane of drawing, so that by rotating the mirror 12, the read spot is shifted in the radial direction. The rotation of the mirror is obtained by means of the drive element 39. This element may take various forms; it is for example an electromagnetic element as shown in FIG. 7, or a piezo-electric element. The drive element is controlled by a control circuit 50, to whose input a radial error signal $S_r$ is applied, i.e. a signal which provides an indication of a deviation of the position of the read spot relative to the centre of the track.

The signal $S_r$ may be generated by means of two detectors which are disposed in the plane 21, one on each side of a line which is effectively parallel to the track direction, as is described in for example German Patent Application No. 2,342,906. By subtracting the output signals of these detectors from each other, a radial error signal $S_r$ is obtained. Thus, an asymmetry in a radial direction of the radiation distribution in the pupil is determined. This is the so-called differential tracking method.

Figure 12:
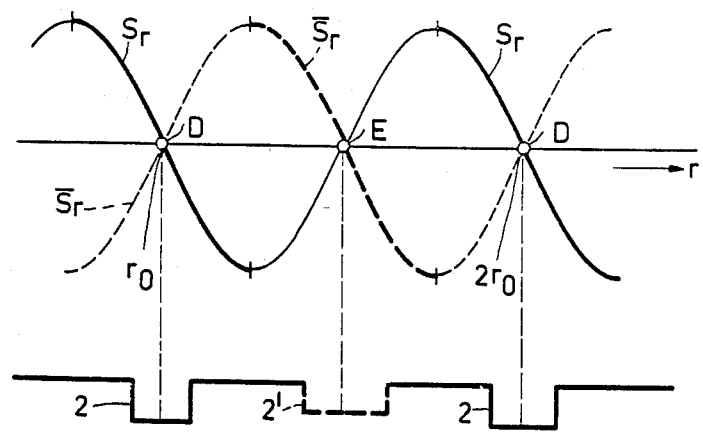
FIG. 12 represents the waveform of a radial error signal in an embodiment of a servo system for controlling the radial position of the read spot.

The servosystem may be adapted so that the information track portions of the greater phase depth, for example $\psi_1 = 5\pi/4$ rad. are followed. In FIG. 12 the uninterrupted line represents the signal $S_r$ as a function of the radial position r of the read spot in the case that only these information track portions would be present. If the read spot is situated exactly on a deep information track portion, i.e. at the locations r, 2r etc., the signal $S_r$ will be zero. The servo system for the tracking is adapted so that in the case of a negative value of $S_r$ the tilting mirror 12 in FIG. 7 is pivoted anti-clockwise, so that the centre of the read spot is positioned exactly on the centre of the deep information track portion 2. For a positive value of $S_r$ the mirror 12 is pivoted clockwise. The points D in FIG. 12 are the stable points for the servosystem.

In a record carrier in accordance with the invention, shallow information track portions 2' are located between the deep information track portions 2. The point E on the curve for $S_r$, which point corresponds to the centre of the information track portion 2', is an unstable point. When the read spot is situated slightly to the right of the centre of the information track portion 2', i.e. if $S_r$ were positive, the mirror 12 would be pivoted clockwise and the read spot would be shifted even further to the right. In a similar way in the case of a deviation to the left of the position of the read spot, said spot would be shifted further to the left. Without further steps the read spot would not remain positioned on a shallow information track portion 2', but the read spot would constantly be controlled towards a deep information track portion.

In accordance with the invention, for reading a shallow information track or track portion, the signal $S_r$ is inverted before being applied to the control circuit 50. The inverted signal $\bar{S}_r$ is represented by the dashed curve in FIG. 12. The point E on the curve for $\bar{S}_r$, which point corresponds to the centre of the information track portion 2′, is a stable point and the points D on said curve are unstable points.

In the apparatus in accordance with FIG. 7 there is provided a combination of an inverter 51 and a switch 52. This enables the signal $S_r$ to be applied to the control 50 in inverted or non-inverted form. The switch 52 is controlled by the signal $S_c$ in synchronism with the switch 28 of FIG. 9. When a deep information track portion is read the signal $S_r$ is not inverted and when a shallow information track portion is read it is inverted. During read-out of an information track 2 the heavy portion of the curve for $S_r$ is used and during read-out of an information track 2′ the heavy portion of the dashed curve for $\bar{S}_r$ is employed.

It is to be noted that the radial error signal $S_r$ contains contributions produced by the information track portions 2 and by the information track portions 2′. As a result of the different phase depths $\psi_1 = 5\pi/4$ rad. and $\psi_2 = 3\pi/4$ rad., these contributions would be in phase opposition. However, as the information track portions 2′ are shifted relative to the information track portions 2 over a distance equal to half the radial period of solely the information track portions 2, the said contributions in the signal $S_r$ will augment each other.

The detectors for reading the information (22 and 23 in FIG. 10) and those for generating the radial error signal may be combined, in the form of four detectors which are disposed in the four different quadrants of an X-Y coordinate system. For reading the information the signals from the detectors in the first and the fourth quadrants as well as the signals obtained from the detectors in the second and the third quadrants are added to each other. The sum signals thus obtained are either added to each other or subtracted from each other as described in the foregoing. For generating the radial error signal the signals from the detectors in the first and the second quadrant are added to each other and so are the signals from the detectors in the third and the fourth quadrant. The sum signals thus obtained are subtracted from each other, yielding the signal $S_r$.

Apart from being used for reading a record carrier with phase depths $\psi_1 = 5\pi/4$ rad. and $\psi_2 = 3\pi/4$ rad., the differential tracking method may also be employed for reading a record carrier with $\psi_1 = 7\pi/6$ rad. and $\psi_2 = 2\pi/3$ rad. For the last-mentioned record carriers tracking may also be realized as for example described in the Applicants' Netherlands Patent Application No. 72 06378 which has been laid open to public inspection and corresponds to U.S. Pat. No. 3,876,842. In addition to the read spot, two servo spots may be projected onto the information structure. These spots are positioned relative to each other so that when the centre of the read spot exactly coincides with the centre of the information track portion to be read, the centres of the servo spots are situated at the two edges of this information track portion. For each servo spot there is provided a separate detector. The difference of the signals from said detectors is determined by the magnitude and the direction of the radial positional error of the read spot.

When reading a record carrier with the phase depths $\psi_1 = 7\pi/6$ rad. and $\psi_2 = 2\pi/3$ rad., a radial error signal may also be generated by radially moving the read spot and the information track to be read periodically relative to each other with a low amplitude, for example 0.1 times the track width and with a comparatively low frequency, for example 30 kHz. The signal supplied by the information detectors then contains an additional component whose frequency and phase depend on the radial position of the read spot. The relative movement of the read spot and the information track can be obtained by periodically moving the read beam in the radial direction. Alternatively, as is described in the Applicants' Netherlands Patent Application No. 73 14267, which has been laid open to public inspection and corresponds to U.S. Pat. No. 4,223,347, the information tracks may be undulating tracks. A positional error signal thus generated should also be inverted when a shallow track is to be read.

The invention has been described for a reflecting record carrier. It is also possible to employ the invention in conjunction with a record carrier having a phase structure which is read in transmission. If the phase structure comprises pits or hills, they should be deeper and higher respectively than the respective pits or hills of a reflecting record carrier.

Furthermore, the invention may also be used for reading a record carrier in the form of a tape. In that case the expression "radial direction" used in the foregoing should read: the direction perpendicular to the track direction.

What is claimed is:

1. A record carrier having an information structure which comprises optically readable information areas arranged in generally parallel information tracks, adjacent information track portions differing from each other in that one of said adjacent track portions contains information areas of a first phase depth and the other of said adjacent portions contains information areas of a second phase depth which differs from the first phase depth by approximately $\pi/2$ radians.

2. A record carrier as claimed in claim 1 wherein the first phase depth is approximately $5\pi/4$ radians and the second phase depth approximately $3\pi/4$ rad.

3. The record carrier according to claim 1 wherein said adjacent track portions are arranged such that one portion containing information areas of the first phase depth in a given track is disposed next to another portion containing information areas of the second phase depth in an adjacent track.

4. A record carrier as claimed in claim 1, 2 or 3 wherein in addition to an information signal a pilot signal is recorded, which pilot signal indicates the transitions between information areas of the first phase depth and information areas of the second phase depth, and vice versa.

* * * * *